W. J. McADAMS.
GRAIN SEPARATOR FOR ATTACHMENT TO THRESHING MACHINES.
APPLICATION FILED OCT. 26, 1909.
956,719.
Patented May 3, 1910.
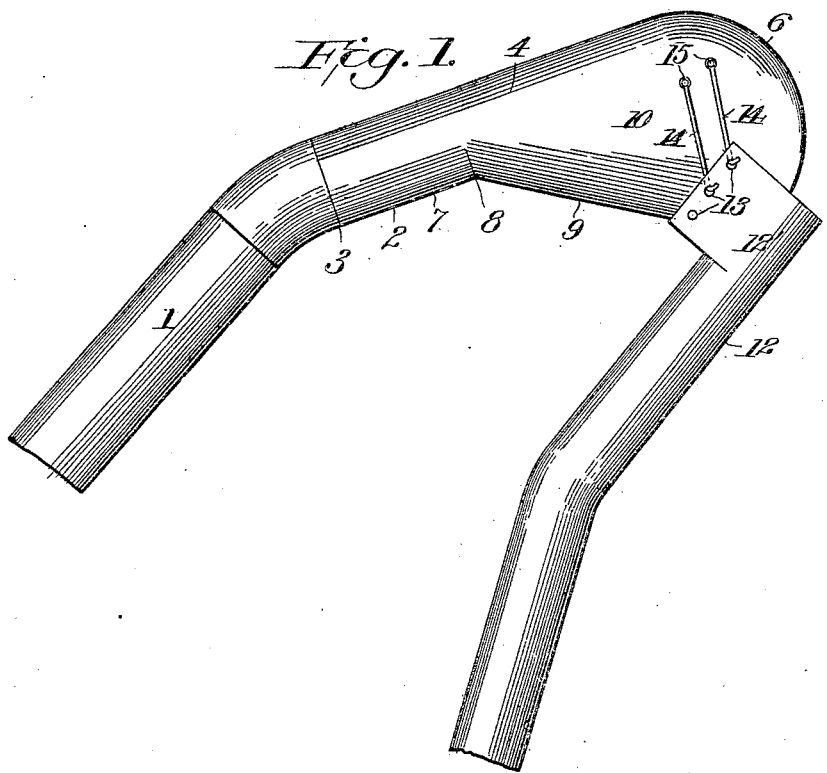
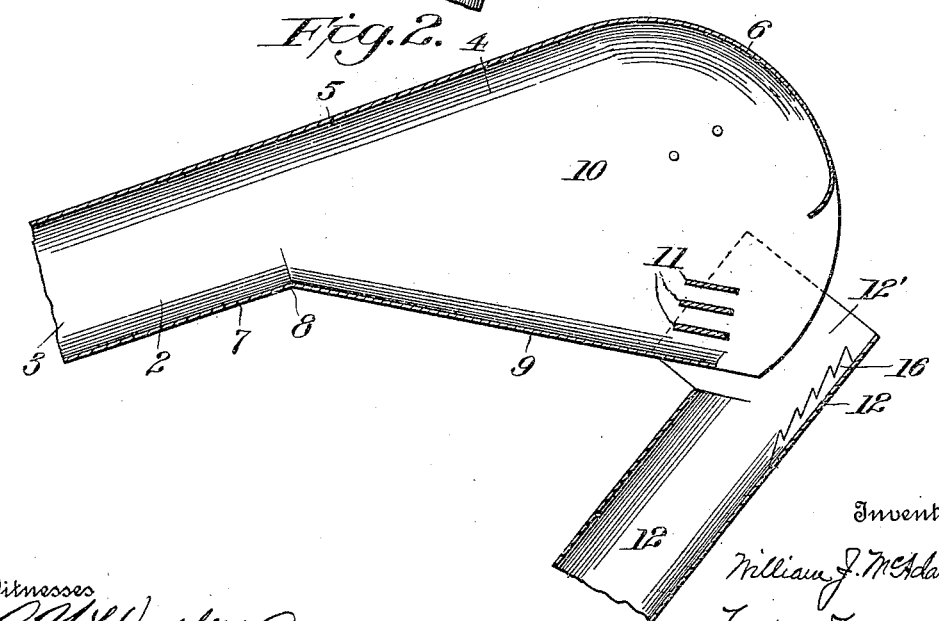

UNITED STATES PATENT OFFICE.

WILLIAM J. McADAMS, OF RUBY, TEXAS.

GRAIN-SEPARATOR FOR ATTACHMENT TO THRESHING-MACHINES.

956,719.  Specification of Letters Patent.  Patented May 3, 1910.

Application filed October 26, 1909. Serial No. 524,725.

*To all whom it may concern:*

Be it known that I, WILLIAM J. MCADAMS, a citizen of the United States, residing at Ruby, in the county of Sherman and State of Texas, have invented certain new and useful Improvements in Grain-Separators for Attachment to Threshing-Machines, of which the following is a specification.

My invention relates to new and useful improvements in threshing machine attachments, and especially to the straw stacker, and the objects of my invention are to provide an economical and practical attachment to a threshing machine straw stacker, with a simple and efficient device for catching and saving the grain which may pass into the stacker with the straw and chaff, in the operation of the machine.

A further object is to provide a device that may be readily adjusted to any of the ordinary stackers now in use, without altering or changing the stacker or interfering with its usefulness after the device is removed.

I attain these objects by the mechanism illustrated in the accompanying drawings, in which—

Figure 1, is a side view of the device assembled ready for use and attached to the discharge end of a stacker, showing a broken away portion of the stacker. Fig. 2, is a sectional side view of the same.

Referring specifically to the drawings, 1, designates the discharge end of an ordinary stacker duct, through which the straw is forced by the blower, operating in connection with the machine.

2 is the end of the device and is telescopically attachable at 3, to the discharge end of the stacker, 1, forming a continuous passage for the straw, as it is forced through the stacker.

4 is the body portion or hood, and is provided with an upper wall 5, extending rearwardly in a direct line with the upper wall of the stacker, when positioned for use. At the discharge end, or mouth, the wall 5 is bent into an abrupt downward curve, 6, forming a deflecting face, precipitating the straw and grain forced through the stacker, against the floor and transverse slats or riddles, as hereinafter detailed. The lower wall of the hood 4, extends in a direct line with the lower wall of the stacker, a short distance, as at 7, where it forms an obtuse angle 8, and from this point extends outwardly as at 9, forming with the upper wall 5, a large end portion, as at 10.

11 are integrally formed transverse slats or riddles, positioned flatwise, one above the other in a vertical series, the lower one being a sufficient distance from the floor of the hood 4, as to permit the free escape of any grain that might pass into the stacker duct with the straw, and adapted to winnow the grain from the straw in its passage.

12 is a discharge duct and down spout, which is provided at its upper end where it is attached to the hood 4, with a trough, 12′, the sides of which are provided with openings 13, adapted to hooked rods 14, pivotally attached to hood 4, at 15. The trough 12′ is provided with a series of longitudinal slats, or strips 16, suitably secured to the floor. These slats are provided with notches on their upper edges so inclined as to prevent the straw and chaff from descending and entering the down spout portion and mixing with the grain.

Having described my invention its operation is as follows;—The hood 4, being attached to the stacker 1, with the down spout 12 secured thereto by means of the hooked rods 14 being inserted in openings 13, bringing the trough 12′ in position directly at the mouth or discharge end of the hood. As the straw is forced through the stacker duct 1, by the machine blower, it enters the hood 4 and is violently forced against the curved face 6, of the hood, and by this curve is deflected, precipitating it upon the transverse slats or riddles 11, which winnow the escaping grain from the straw and it passes upon the inclined floor 9, of the hood, and by reason of this inclination is carried into the trough 12′, from which it passes into the down spout to the receptacle provided for it. The straw continues out of the hood 4, passing over the transverse slats 11, and the longitudinal notched strips 16, in the discharge duct 12′ and passes to the stack.

By means of the lateral hooked rods, 14 engaging the openings in the upper end of the discharge duct, at 13, the said discharge duct can be adjusted to any angle with the discharge end of the hood 4, to accommodate light or heavy straw, the force or excessive wind of the machine blower, or an unusual wind from the outside. In this way the discharge can be regulated, and the straw, whether light or heavy, can be easily controlled and the passing grain winnowed therefrom. The force of the machine blower throws the straw in such manner against the curve 6 of the hood 4, that if there still remains any grain therein it winnows much of it out, and causes the chaff and dirt to pass rapidly out of the device.

This construction not only thoroughly fans the chaff and straw clear of the grain, but by three separate winnowings as herein detailed, all the grain is winnowed from the straw.

Having described my invention, what I claim and desire to secure by Letters Patent is:—

1. In a device of the class described, a stacker attachment, comprising a hood adaptable to telescopic connection with the discharge end of a pneumatic stacker, having its upper wall curved downwardly at its discharge end and an outwardly inclined floor, and provided with a vertical series of integrally formed transverse slats adjacent to the discharge end; lateral hooked rods pivotally attached to the said hood and adapted to secure the discharge duct in attachment therewith; and a discharge duct, one end having lateral openings adapted to engage the lateral hooked rods pivotally attached to the hood and the floor thereof provided with a transverse series of longitudinal, notched strips, all substantially as set forth.

2. In a pneumatic stacker attachment, the combination of a hood adapted to telescopic connection with the discharge end of a pneumatic stacker, having its upper wall curved downwardly at its discharge opening, and an outwardly inclined floor and provided with a vertical series of integrally formed transverse slats adjacent to the discharge opening and lateral hooked rods pivotally attached to the hood, with a discharge duct having lateral openings adapted to engage the lateral hooked rods pivotally attached to the hood, and provided with a transverse series of longitudinal, notched strips, all substantially as described.

In testimony whereof I affix my signature in presence of two witnesses.

WILLIAM J. McADAMS.

Witnesses:
WALTER COLTON,
J. R. WILSON.